(12) United States Patent
Meynier

(10) Patent No.: US 6,412,592 B1
(45) Date of Patent: Jul. 2, 2002

(54) ELECTRICALLY INCLINATION COMPENSATED DEVICE FOR PICKING UP ELASTIC WAVES

(75) Inventor: Patrick Meynier, Chatou (FR)

(73) Assignee: Institut Francais du Petrole, Rueil-Malmaison Cedex (FR)

( * ) Notice: Subject to any disclaimer, the term of this patent is extended or adjusted under 35 U.S.C. 154(b) by 0 days.

(21) Appl. No.: 09/587,294

(22) Filed: Jun. 5, 2000

(30) Foreign Application Priority Data

Jun. 7, 1999 (FR) .................................. 99 07242

(51) Int. Cl.$^7$ ................................................ G01V 1/16
(52) U.S. Cl. ........................ 181/122; 181/104; 181/108; 367/182
(58) Field of Search .................... 181/122, 104, 181/108; 367/182–184, 179, 188

(56) References Cited

U.S. PATENT DOCUMENTS

| | | | |
|---|---|---|---|
| 3,878,504 A | | 4/1975 | Sears .......................... 340/17 |
| 4,159,464 A | * | 6/1979 | Hald, Jr. |
| 4,232,379 A | * | 11/1980 | Ensing ......................... 367/43 |
| 4,525,819 A | | 7/1985 | Hefer .......................... 367/188 |
| 5,172,345 A | * | 12/1992 | van der Poel ............... 367/178 |

FOREIGN PATENT DOCUMENTS

| | | | |
|---|---|---|---|
| FR | 2247703 | 5/1975 | ............ G01C/9/12 |
| JP | 403056830 | * | 3/1991 |
| JP | 403067132 | * | 3/1991 |

* cited by examiner

*Primary Examiner*—Shih-Yung Hsieh
(74) *Attorney, Agent, or Firm*—Antonelli, Terry, Stout & Kraus, LLP

(57) ABSTRACT

A device which picks up elastic waves, such as a geophone for example, in positions far from the natural operating position for which it is designed. The device comprises an electrodynamic pickup including a magnet (1), a moving coil (2) placed in the magnetic field, springs (4) suited to hold the coil in a well-centered static position when the axis thereof is parallel to a selected reference direction (horizontal or vertical, for example) and a current source which applies to the coil an electrical current which corrects any unbalance of the coil in relation to the static position thereof due to an inclination of the axis of the coil in relation to the reference direction. The current source may be for example a source of direct current (5) and a voltage divider (P) whose division factor depends on the angle between the axis of the pickup and a reference axis or a compensating device suited to minimize the distortion ratio of the geophone.

16 Claims, 5 Drawing Sheets

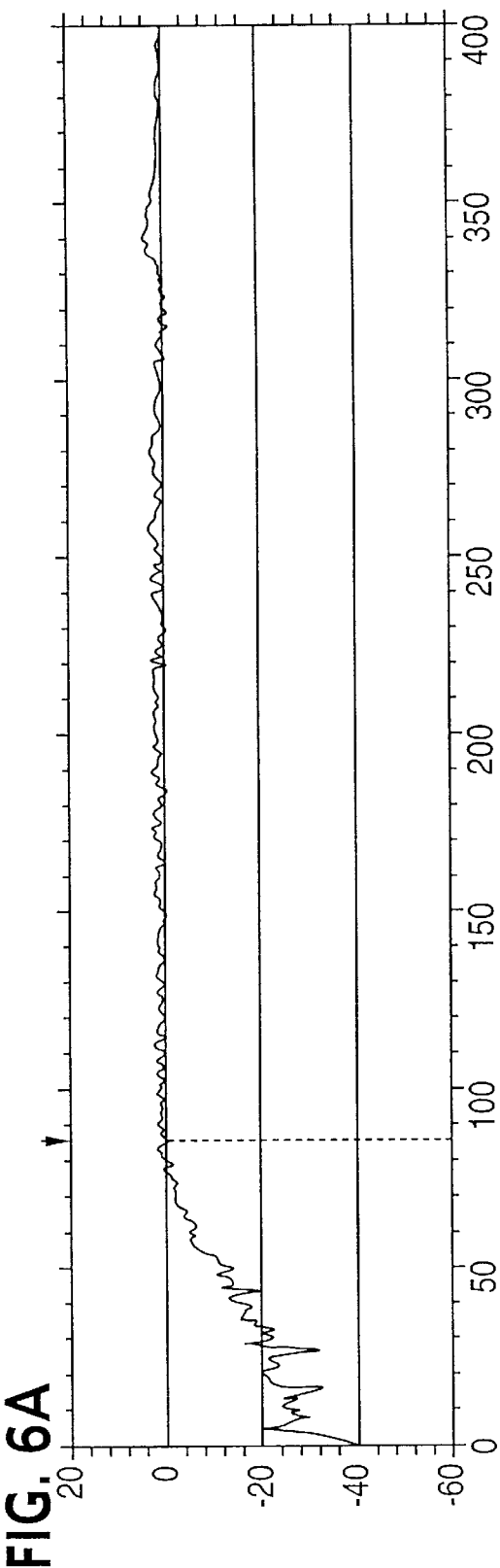
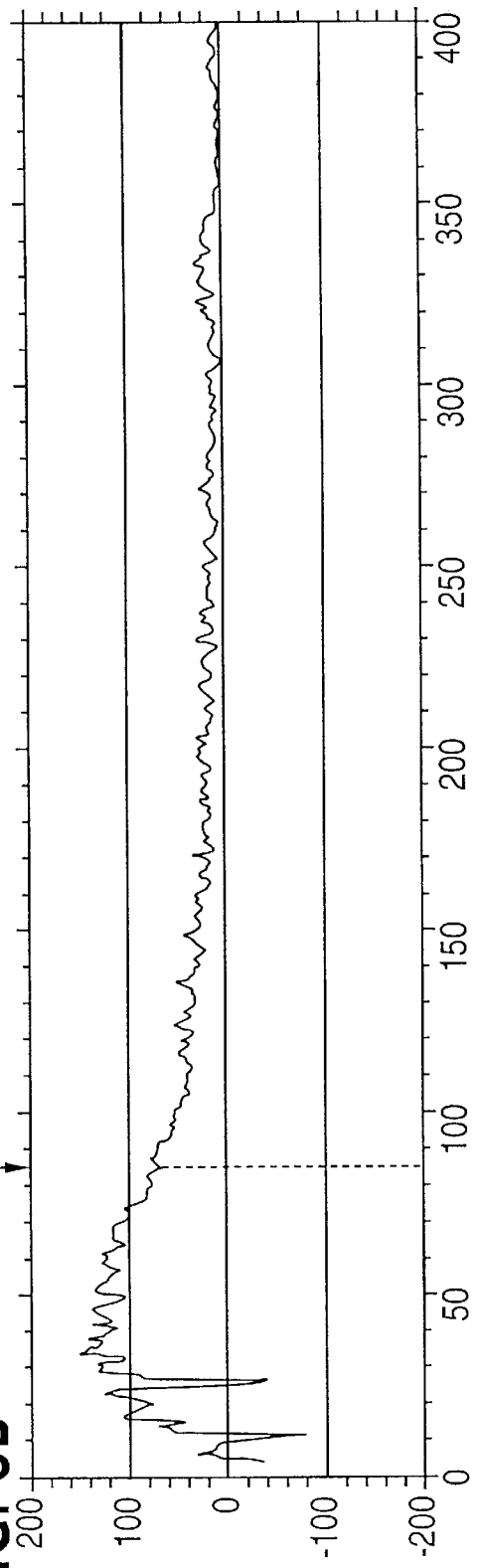
FIG. 6A
FIG. 6B

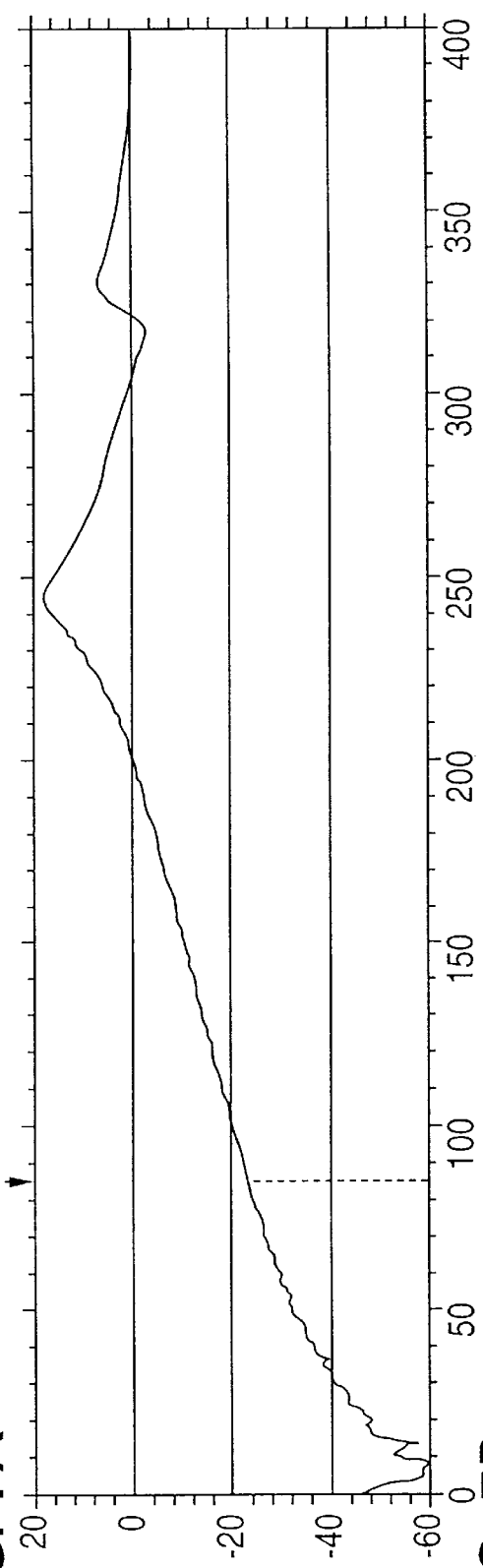
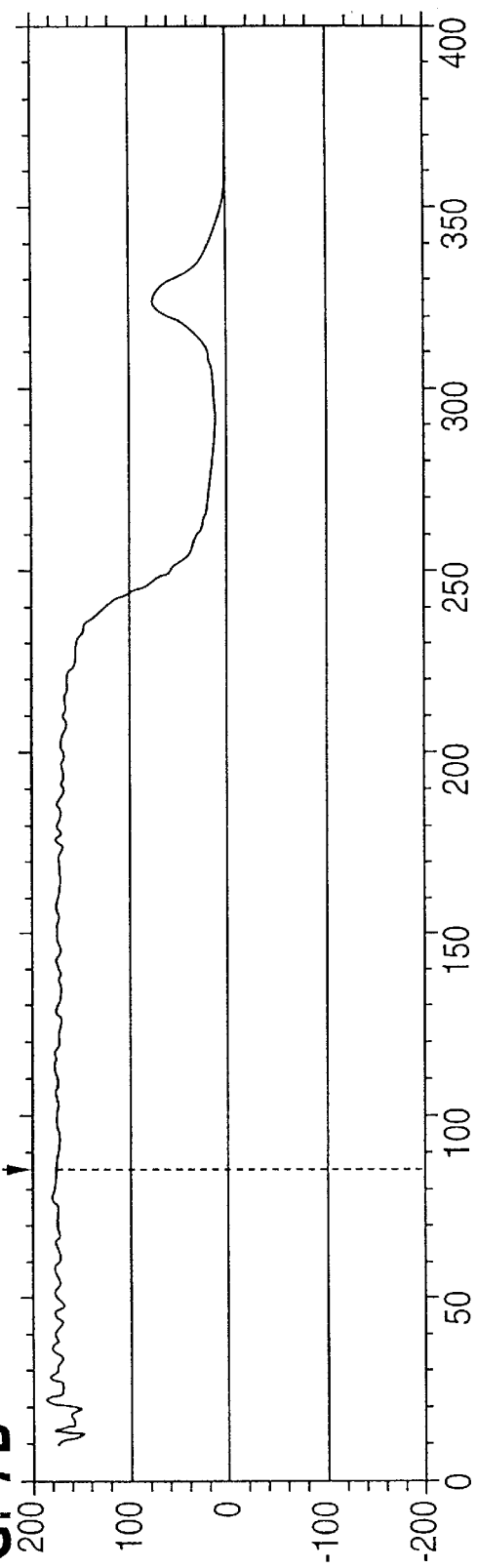
FIG. 7A
FIG. 7B

ELECTRICALLY INCLINATION COMPENSATED DEVICE FOR PICKING UP ELASTIC WAVES

BACKGROUND OF THE INVENTION

1. Field of the Invention

The present invention relates to a device which picks up elastic waves, such as a geophone, which is electrically inclination compensated and therefore suited to work in different orientations (directions).

2. Description of the Prior Art

Geophones are designed to pick up low-frequency or very low-frequency vibrations. They most usually comprise a cylindrical moving coil suspended around a magnet by means of springs. The coil oscillates along an axis on either side of a position of equilibrium defined by the springs. The springs are necessarily very flexible in order to obtain a very low resonant frequency. They are suited to work in positions where the coil is either vertical or horizontal. The springs are designed to compensate for the weight of the coil and to keep it centered around the magnet. The characteristics of the springs are different in each case. Compensation is perfect only for a well-defined operating position. If the geophone is moved away from the operating position for which it is designed, the coil is no longer properly centered around the magnet, which leads to a harmonic distortion increase. The offset thus generated has the effect of reducing the maximum travel of the coil around its position of rest where it comes to a stop position and therefore of reducing the dynamic reproduction range of the geophone.

The unbalance is all the greater as the geophone moves away from its natural operating position. It is a real handicap for applications where the operating position of the geophone is difficult to control, which is notably the case in deviated wells. A known solution consists in mounting the geophones in a double-gimballed and unbalanced suspension holding the oscillating system in its optimum position whatever the effective orientation of the housing. This solution is complicated and therefore expensive. It affects the response of the geophone in the upper part of the seismic frequency band. The geophone is bulky and difficult to fit in the generally limited spaces available.

Examples of the prior art in the field of geophones with moving coils are for example described in the following U.S. Pat. No. 4,811,211; 4,618,949, and 4,525,819.

SUMMARY OF THE INVENTION

A device for picking up elastic waves (seismic or acoustic waves) according to the invention is suited to work in positions that are far from the natural operating position thereof, for which it is designed, without the aforementioned drawbacks.

The device of the invention comprises an electrodynamic pickup including a magnetic source which generates a magnetic field, a moving coil placed in the magnetic field, and springs which hold the coil in a well-centered static position when the axis thereof is parallel to a reference direction (horizontal or vertical for example). The device comprises a current source which applies to the coil an electric current which corrects any unbalance of the coil in relation to its static position due to an inclination of the axis of the coil in relation to the reference direction.

The current source comprises a source of direct current and a voltage divider whose division factor depends on the angle between the axis of the geophone and a reference axis.

The divider comprises for example a potentiometer whose cursor is connected to an unbalance sensor.

According to another embodiment, the current source comprises a distortion analyzer which generates the electric correction current suited to minimize the distortion.

BRIEF DESCRIPTION OF THE DRAWINGS

Other features and advantages of the device according to the invention will be clear from reading the description hereafter of non limitative examples, with reference to the accompanying drawings wherein:

FIGS. 6A and 6B show the frequency and phase responses of the same geophone disturbed by an inclination at 45° to the horizontal, FIGS. 7A and 7B show the frequency and phase responses of the same geophone even more disturbed by a vertical positioning (inclination of the geophone at 90° to the horizontal)

DETAILED DESCRIPTION

Figure 1:
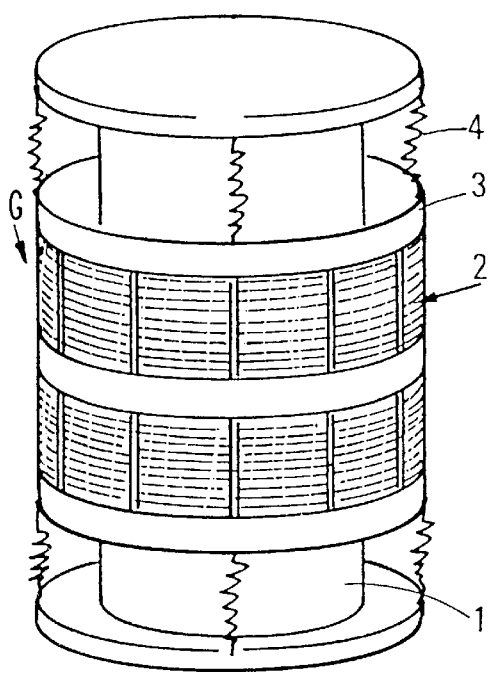
FIGS. 1 and 2 diagrammatically show a conventional electrodynamic geophone structure.
Figure 2:
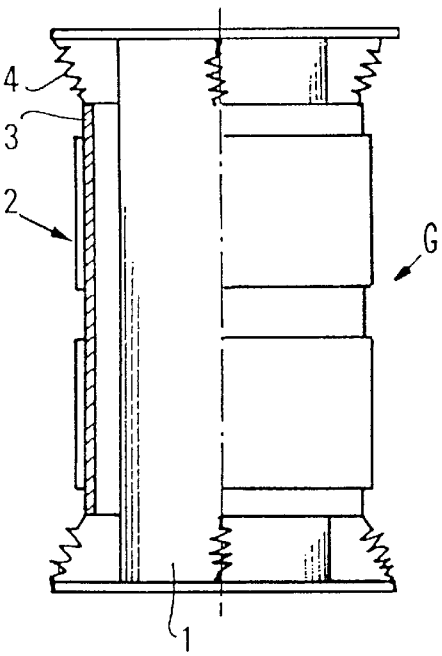

Geophone G in FIGS. 1 and 2 conventionally comprises, in a housing (not shown), a magnet 1, a coil 2 wound around a cylindrical support 3 and springs 4 (schematically shown here) intended to keep cylindrical support 3 in static equilibrium in a well-centered position around magnet 1. Springs 4 are suited to the operating mode. They are adjusted differently according to whether the geophone is intended to work with the axis of the coil pointed horizontally or vertically.

Figure 3:
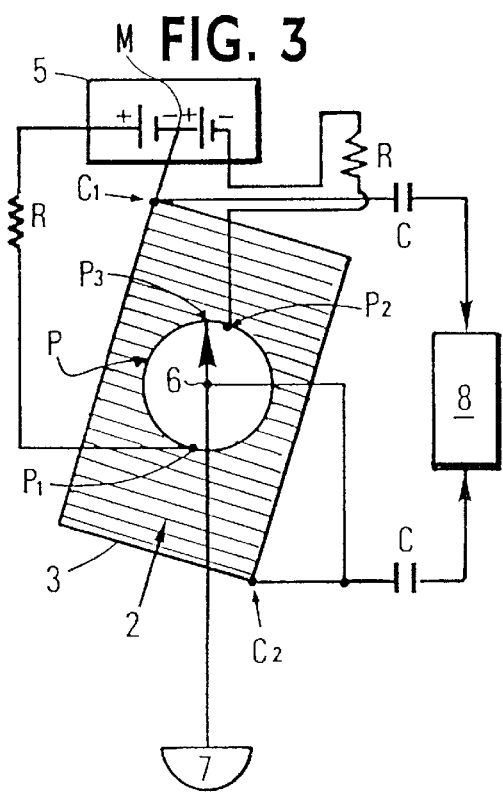
FIG. 3 shows a first embodiment of the device of the invention with a geophone as shown in FIGS. 1 and 2 associated with means providing static angular displacement correction.
Figure 4:
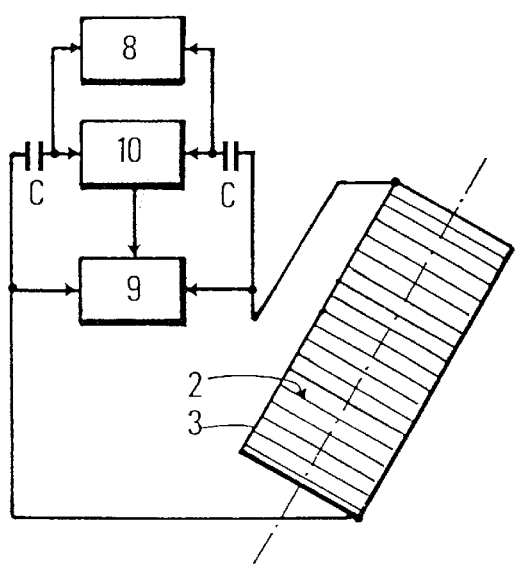
FIG. 4 shows another embodiment of the device of the invention where the geophone is associated with a distortion analyzer.
Figure 5A:
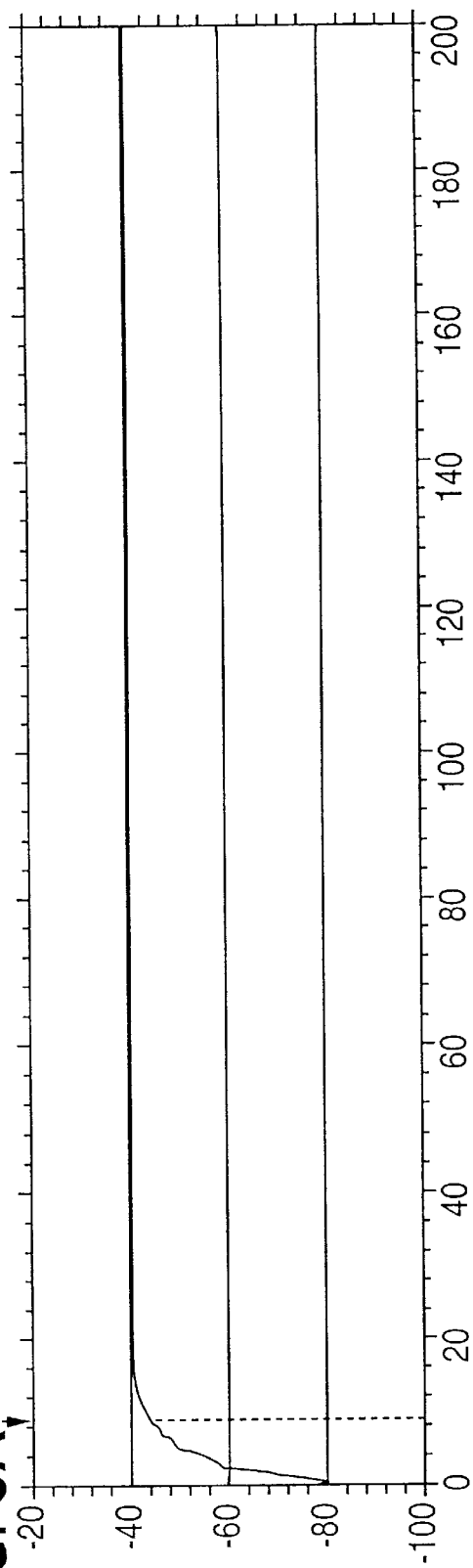
FIGS. 5A and 5B show, by way of reference, the frequency and phase responses of a geophone suited by design to work with the axis of its coil parallel to the horizontal.
Figure 5B:
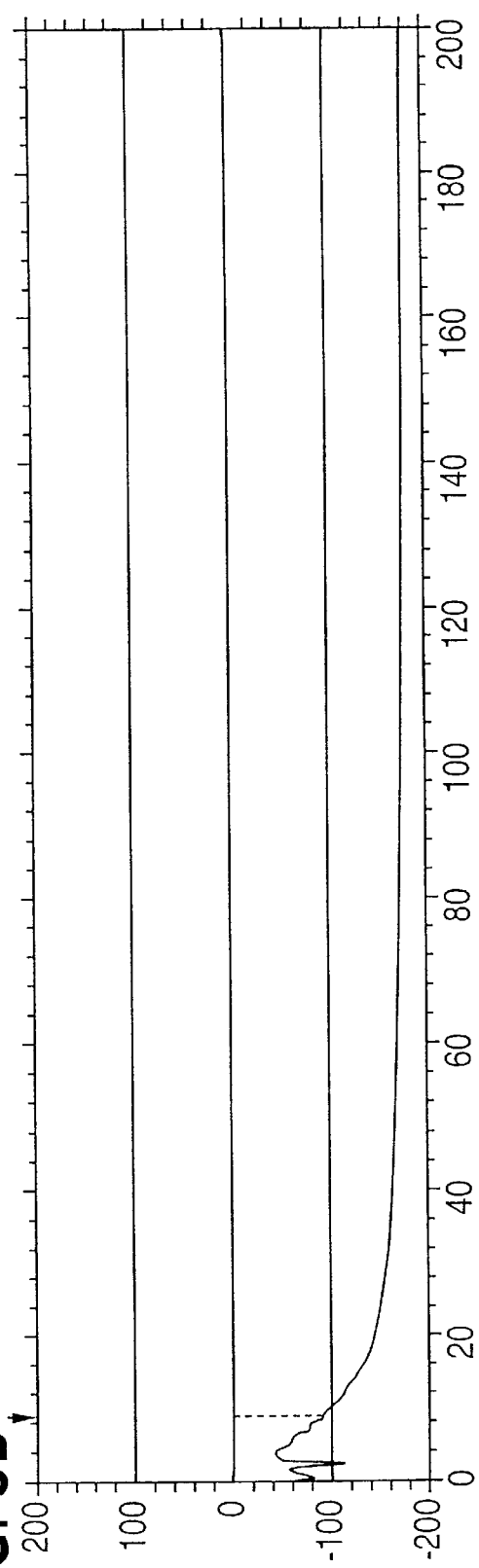
Figure 8A:
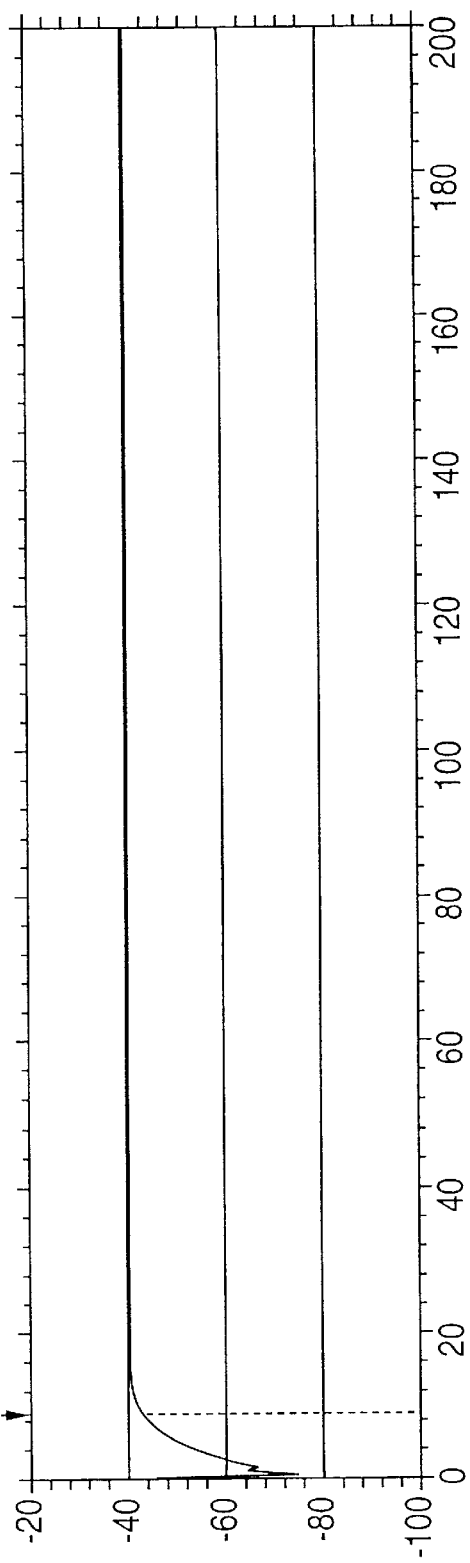
FIGS. 8A and 8B show the perfect compensation provided when applying a suitable direct compensation voltage to the same geophone arranged vertically.
Figure 8B:
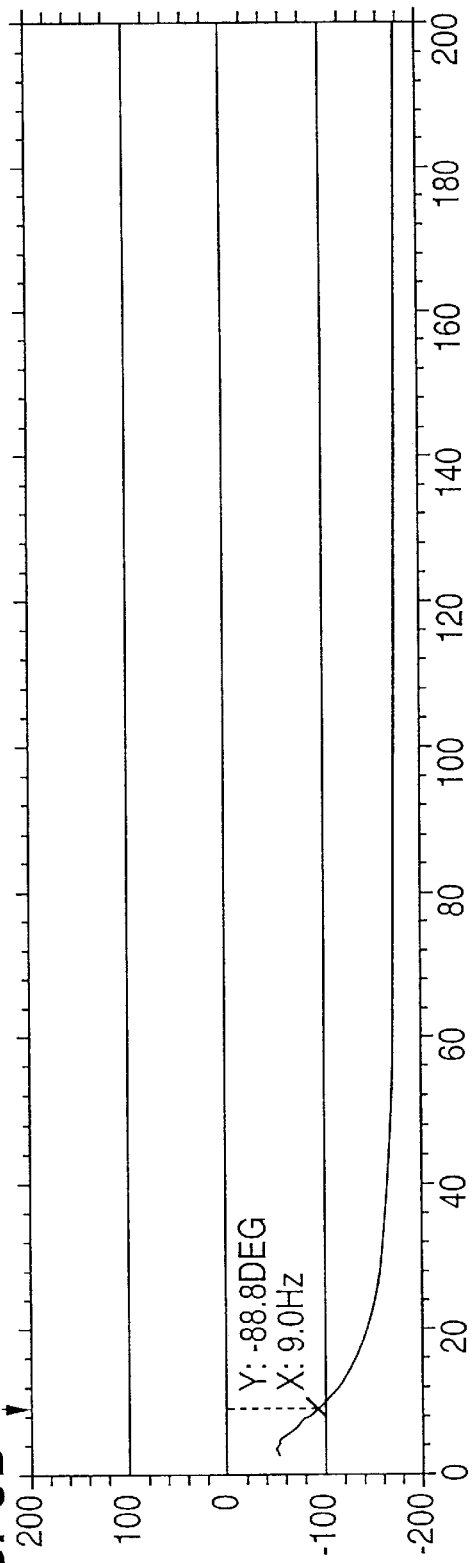

Accordingly to the embodiment of FIG. 3, the device comprises, in combination with a geophone G of horizontal axis, a source 5 of direct current with a midpoint M connected to a first terminal Cl of coil 2, and two terminals + and − respectively connected by a resistor R to terminals P1, P2 of a potentiometer P whose body is fixed in relation to the housing of the geophone.

Midpoint P3 of potentiometer P is mechanically connected to an element 7 suited to define a fixed reference direction, consisting for example of a vertical pendulum. The two terminals C1, C2 of the geophone coil are connected, by means of decoupling capacitors C, to a device 8 which acquires the signals generated in response to the received waves. The points of connection at the three terminals P1–P3 of the potentiometer are so selected that the direct voltage applied to the geophone in its normal operating position (horizontal for the geophone of FIG. 3 for example) is zero and increases proportionally to the inclination of the axis in relation to the reference direction, until a maximum valve of 90° in absolute value is reached, with polarity reversal of the voltage applied according to whether the angle of inclination is positive (trigonometric direction) or negative in relation to this reference direction.

According to another embodiment, the terminals of coil 2 are directly connected to the terminals of a source of voltage of variable amplitude and polarity 9. By means of decoupling capacitors C, these terminals are connected on the one hand, as previously described, to a device 8 which acquires the signals picked up by the geophones, and on the other hand to a device 10 which measures the distortion affecting the picked up signals and, if the measured level is higher than a normal threshold value (corresponding to specifications), as a result of an inclination of the axis of the coil in relation to the specified reference direction, to control application by source 9 of a direct voltage suited to minimize it.

The functionalities of devices 8 and 10 (digitizing, storage, distortion measurement, selection of the voltage to be applied to the coil) can for example be fulfilled by a computer provided with suitable programs.

FIGS. 6A and 6B and 7A and 7B show serious distortions of the frequency and phase response of a geophone, which become more serious as the angle of inclination in relation to the natural operating position is great. Comparison of FIGS. 8A and 8B and FIGS. 5A and 5B clearly shows that application of a suitable compensation voltage to the hydrophone substantially restores notably the frequency and phase responses.

The device according to the invention finds applications notably in the field of seismic prospecting or of active or passive monitoring of underground reservoirs. For these applications, as shown for example in U.S. Pat. No. 5,363,094 and 5,724,311 and European patents 0,748,457 and 0,921,416, often large arrays of geophones have to be installed in exploration and/or production wells which deviate in relation to the vertical (possibly horizontal in certain portions). In order to obtain better discrimination of the elastic waves reflected by subsoil discontinuities, multicomponent geophones (referred to as a triphone) are commonly installed to detect the components of the signals received along three orthogonal axes. The device according to the invention allows, in this type of application, providing exactly the compensation required whatever the effective inclination of the geophone at the depth of use.

The functions of geophone inclination compensation and of acquisition of the signals picked up can be fulfilled at the surface or partially by local modules lowered into the wells in the vicinity of the geophones.

An application of the device in deviated wells has been described. It is however clear that the device can be used in any application where its effective orientation during operation is difficult to control. This is notably the case in applications where pickups are lowered on to the bottom of a water body mass in order to be coupled with underground formations.

What is claimed is:

1. An inclination compensated electrodynamic sensor which senses elastic waves comprising:
    a source of a magnetic field which generates a magnetic field;
    a moving coil placed in the magnetic field, springs which hold the coil in a centered static position when an axis of the coil is parallel to a reference direction; and
    a source of direct current which applies to the coil direct electrical current which corrects any unbalance of the coil in relation to the static position thereof due to an inclination of the axis of the coil in relation to the reference direction.

2. A sensor in accordance with claim 1 comprising:
    a direct current voltage source which applies a direct current voltage to a variable resistance, that provides the electrical current to the coil with the electrical current being a function of the inclination of the axis of the coil in relation to the reference direction.

3. A sensor in accordance with claim 2 wherein:
    the electrical current is proportional to the inclination.

4. A sensor in accordance with claim 3 wherein:
    the variable resistance is a potentiometer having a mechanical coupling which varies the resistance of the potentiometer which is coupled to an element permanently aligned with a vertical orientation.

5. A sensor in accordance with claim 2 wherein:
    the variable resistance is a potentiometer having a mechanical coupling which varies the resistance of the potentiometer which is coupled to an element permanently aligned with a vertical orientation.

6. A method providing inclination compensation for an electrodynamic sensor comprising a source of a magnetic field, a moving coil placed in the magnetic field, springs which hold the coil in a centered static position when an axis of the coil is parallel to a reference direction when the sensor is used in a inclined position, the method comprising:
    applying to the moving coil a direct electrical current which corrects any unbalance of the coil in relation to the static position thereof due to an inclination of the axis of the coil in relation to the reference direction.

7. A method in accordance with claim 6 wherein:
    a direct current voltage source applies a direct current voltage to a variable resistance, that provides the electrical current to the coil with the electrical current being a function of the inclination of the axis of the coil is relation to the reference direction.

8. A method in accordance with claim 7 wherein:
    the electrical current is proportional to the inclination.

9. A method in accordance with claim 7 wherein:
    the variable resistance is a potentiometer having a mechanical coupling which varies the resistance of the potentiometer which is coupled to an element permanently aligned with a vertical orientation.

10. A method in accordance with claim 6 wherein:
    the variable resistance is a potentiometer having a mechanical coupling which varies the resistance of the potentiometer which is coupled to an element permanently aligned with a vertical orientation.

11. A method for providing inclination compensation for an electrodynamic geophone including a source which generates a magnetic field, a moving coil placed in the magnetic field and springs which hold the moving coil in a centered static position when an axis of the coil is parallel to a reference direction when the geophone is used in a deviated borehole, the method comprising:
    applying to the moving coil a direct electrical current which corrects any unbalance of the coil in relation to the static position thereof due to an inclination of the axis of the coil in relation to the reference direction.

12. A method in accordance with claim 11 wherein:
    a direct current voltage source applies a direct current voltage to a variable resistance, that provides the electrical current to the coil with the electrical current being a function of the inclination of the axis of the coil in relation to the coil in relation to the reference direction.

13. A method in accordance with claim 12 wherein:

the variable resistance is a potentiometer having a mechanical coupling which varies the resistance of the potentiometer which is coupled to an element permanently aligned with a vertical orientation.

14. A method for providing inclination compensation for an electrodynamic geophone including a source which generates a magnetic field, a moving coil placed in the magnetic field and springs which hold the coil in a centered static position when an axis of the coil is parallel to a reference direction when the geophone is positioned in a tilted position when coupled a waterbody bottom, the method comprising:

applying to the moving coil a direct electrical current which corrects any unbalance of the coil in relation to the static position thereof due to an inclination of the axis of the coil in relation to the reference direction.

15. A method in accordance with claim 14 wherein:

a direct current voltage source which applies a direct current voltage to a variable resistance that provides the electrical current to the coil with the electrical current being a function of the inclination of the axis of the coil in relation to the reference direction.

16. A method in accordance with claim 15 wherein:

the variable resistance is a potentiometer having a mechanical coupling which varies the resistance of the potentiometer which is coupled to an element permanently aligned with a vertical orientation.

\* \* \* \* \*